FIG. I

INVENTOR
CHARLES T. CHAVE

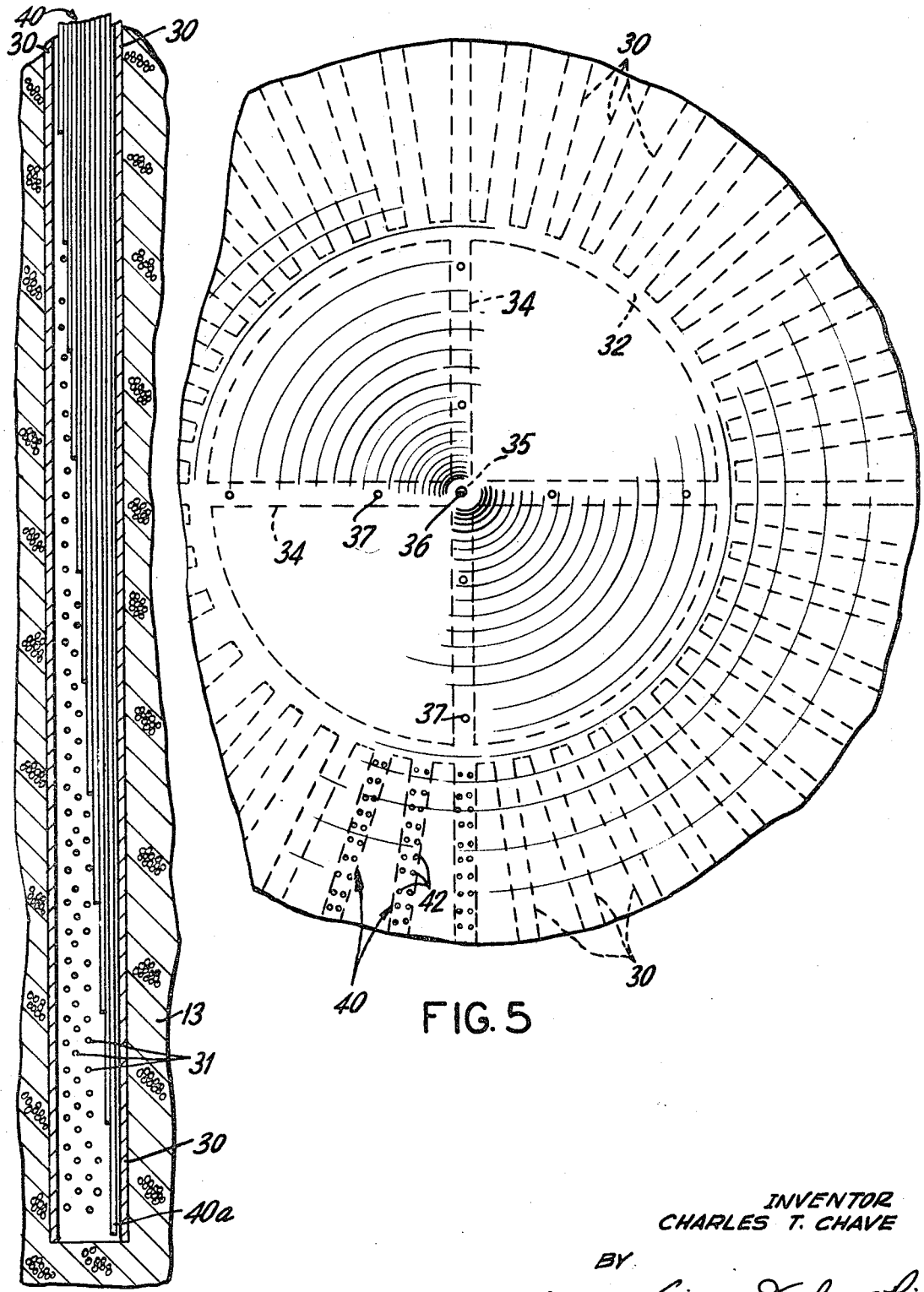

United States Patent Office 3,444,725
Patented May 20, 1969

3,444,725
LEAK DETECTING AND LOCATING SYSTEM FOR NUCLEAR REACTOR CONTAINMENT VESSELS
Charles T. Chave, Wellesley, Mass., assignor to Stone & Webster Engineering Corporation, Boston, Mass., a corporation of Massachusetts
Filed Apr. 6, 1967, Ser. No. 628,918
Int. Cl. G01m 3/04
U.S. Cl. 73—40.7    4 Claims

ABSTRACT OF THE DISCLOSURE

A system for detecting and locating the area of leakage in nuclear reactor dual containment structures which utilizes groups of conduits of varying lengths placed adjacent the inner surface of the outer containment shell and uniformly distributed over the entire area of the inner periphery of the shell. All of the conduits terminate at the apex of the containment structure so as to be accessible from outside the containment structure. The annular space between the containment shells is purged of air with an inert gas and the conduits are individually connected to a vacuum pump with the gas exhausted from each of the conduits passed through an oxygen analyzer. The detection of oxygen in any of the exhausted gas signals a leak in the outer containment shell and the conduit from which the oxygen is detected locates the area in which the leakage is occurring.

BACKGROUND AND OBJECTS OF THE INVENTION

This invention relates generally to nuclear reactor containment vessels, and relates more particularly to a novel and improved leak detection and location system in nuclear power reactor containment vessels for locating the position of a leak in the outer containment wall of a dual containment structure.

Nuclear reactor plants are now in use in the field of electrical power generation. For economic reasons, such nuclear reactor powered generating plants must often be located in close proximity to heavily inhabited areas. It is, therefore, essential for the general safety of the adjacent populace that such reactor plants be enclosed within suitable containment vessels. The purpose of the containment vessel is to surround the nuclear reactor and primary system and to prevent the leakage of radioactive gases or vapors from within the enclosure to the surrounding area both during normal operation and, especially, in the event of certain types of nuclear incidents.

In sparsely settled locations, under normal operating conditions, a single steel-lined shell, properly reinforced, is generally considered to be an adequate containment vessel. However, in areas of dense population, single shell containment vessels, built even with the best practical degree of commercial leak-tightness, may permit a prohibitive amount of leakage.

For additional safety in containment, vessels with dual steel shells have been constructed with the outer shell embedded in reinforced concrete. The outer shell is larger and completely encloses the smaller inner shell. Containment vessels of this type of construction, having certain leakage controlling and monitoring means, are described in U.S. patent applications Ser. No. 212,864, Clarence T. Gordon, filed July 27, 1962, now Patent No. 3,320,969 and Ser. No. 212,862, Gans et al, filed July 27, 1962, now Patent No. 3,322,141; those applications are incorporated herein by reference.

Heretofore, containment vessels of the type disclosed in the aforementioned applications, while being capable of detecting the existence of a leak in the outer steel liner, have suffered from a lack of ability to locate the position of the leak so that the defective portion of the vessel may be repaired. The leak detecting and locating system of the present invention overcomes this disadvantage in dual shell containment vessels. While the invention is particularly adaptable to containment vessels of the type disclosed in the aforementioned applications, and is accordingly illustrated and described, by way of example, as being adapted to such construction, it will be seen to those skilled in the art that it is also applicable to other types of containment vessels.

It is therefore an object of this invention to provide a new and improved system for detecting and locating a leak in the wall of a nuclear reactor containment vessel.

It is another object of the invention to provide a new and improved system for detecting and locating the position of a leak in the outer shell of a dual shell nuclear reactor containment vessel.

Another object of the invention is to provide a new and improved system for detecting and locating the position of a leak in the outer shell of a dual shell nuclear reactor containment vessel which permits the integrity of the vessel to be monitored entirely from outside the vessel and to simultaneously locate the position of a leak from the monitoring operations.

Another object of the invention is to provide a new and improved system for detecting and locating the position of a leak in the outer shell of a dual shell nuclear reactor containment vessel which is simple in construction and operation, does not require highly sensitive equipment, and is of permanent utility throughout the life of the containment vessel.

Objects and advantages of the invention have been set forth in part herein and in part will be obvious herefrom, or may be learned by practice with the invention, the same being realized and attained by means of the instrumentalities, steps, processors, and combinations pointed out in the appended claims.

The invention consists in the novel parts, constructions, arrangements, steps, combinations and improvements herein shown and described.

SUMMARY OF INVENTION

Briefly described, the present invention relates to a new and improved method and apparatus for monitoring and locating a leak in the outer containment shell of a dual shell containment structure for a nuclear power reactor. As embodied, groups of conduits of varying lengths are placed adjacent the inner surface of the outer containment shell and uniformly distributed over the entire area of the inner periphery thereof. All of the conduits terminate near the apex of the containment structure so as to be accessible from outside the containment structure. The annular space between the containment shells is purged of air with an inert gas and maintained at a slightly negative pressure, whereupon the conduits are individually connected to a vacuum pump with the gas exhausted from each of the conduits passed through an oxygen analyzer. The detection of oxygen in any of the exhausted gas signals a leak in the outer containment shell and the terminal point of the conduit from which the oxygen is detected locates the area in which the leakage is occurring.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

BRIEF DESCRIPTION OF THE DRAWINGS

Of the drawings:

FIGURE 4 is a fragmentary vertical sectional view, partly in elevation, taken along lines 4—4 of FIGURE 3 illustrating the stepped terminal points of the leak-locating conduits within a single channel; and FIGURE 5 is a fragmentary plan view of the apex of the dome of the containment structure of FIGURE 1, illustrating in dotted lines the convergence of the leak-locating conduit containing channels into an annular manifold chamber, the latter in turn communicating with a source of inert gas through radial channels which terminate at the apex of the containment structure.

DESCRIPTION OF THE PREFERRED EMBODIMENT

Figure 1:
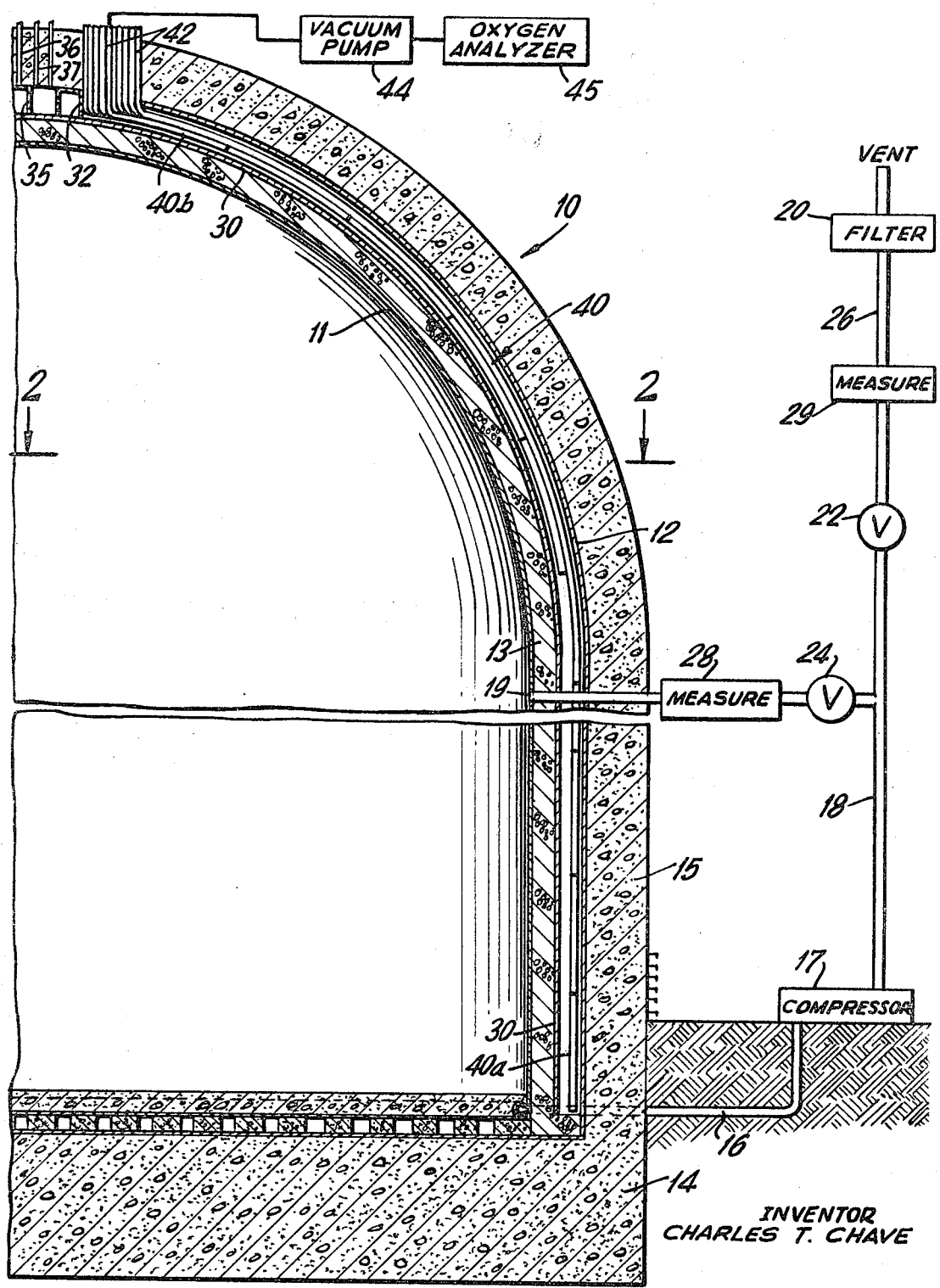
FIGURE 1 is a fragmentary vertical sectional view, partly schematic and partly in elevation, of one-half of a dual shell nuclear reactor containment structure illustrating a leak detection and locating system embodying the invention.
Figure 2:
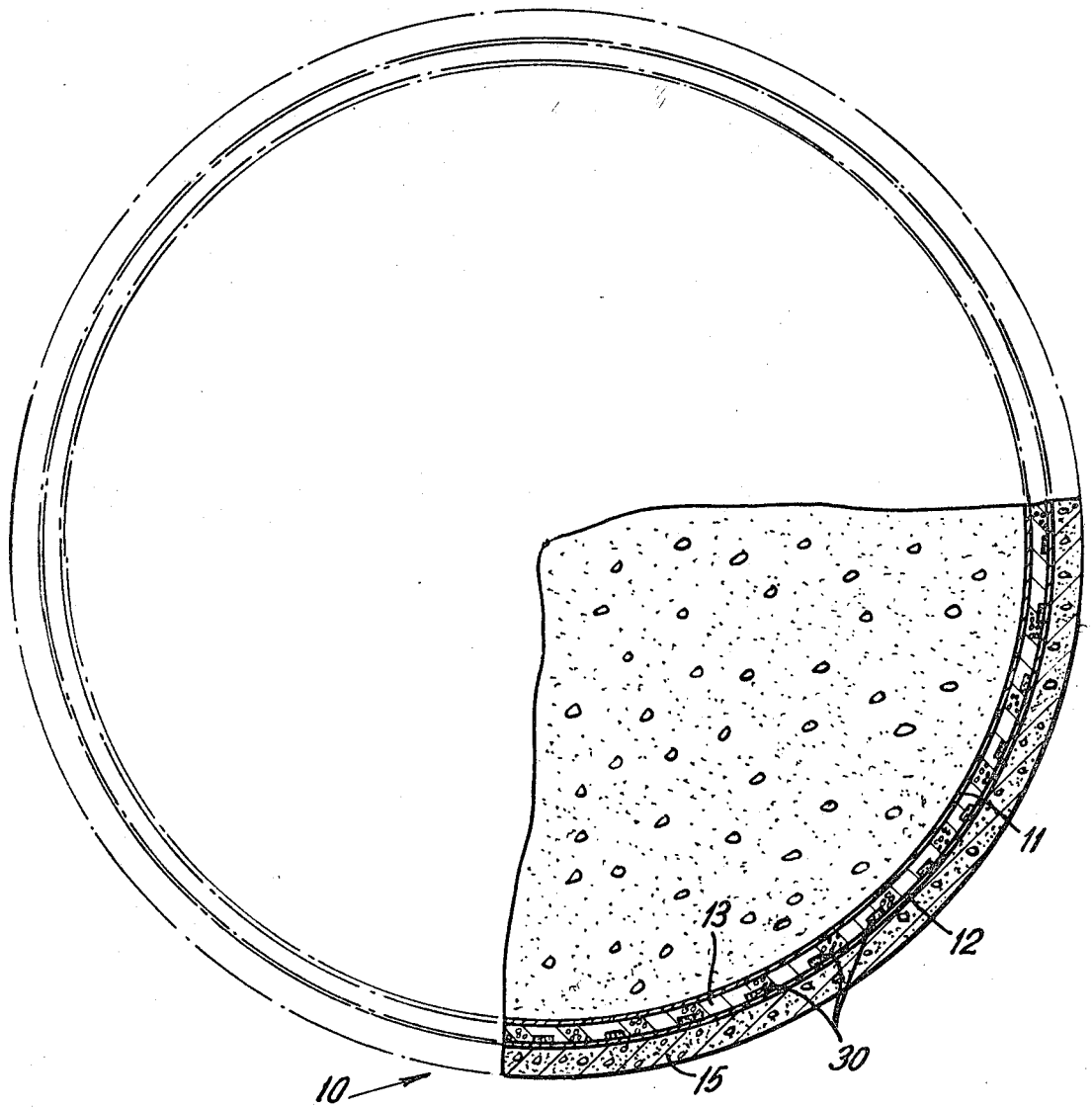
FIGURE 2 is a transverse sectional view taken along lines 2—2 of FIGURE 1.
Figure 3:
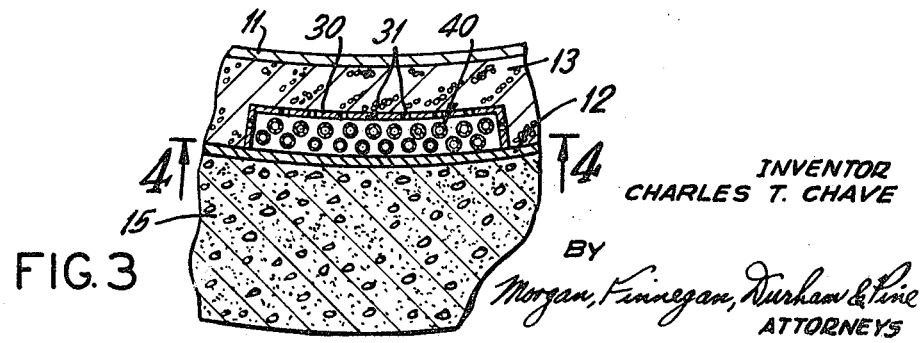
FIGURE 3 is an enlarged sectional view of a small portion of FIGURE 2, showing the arrangement of the leak-locating conduits of the leak detection and locating system of the invention.

Referring now to the accompanying drawings, as previously indicated there is illustrated a nuclear power reactor containment structure of the dual shell type indicated generally by reference numeral 10, similar in construction to the containment vessel of the aforementioned pending applications Ser. No. 212,862 and Ser. No. 212,864. Thus, structure 10 includes an inner or primary shell of cylindrical configuration which converges into a dome at the apex thereof and a secondary or outer shell 12 of similar shape but larger overall size so as to completely surround and enclose the primary shell 11 and to provide a substantial annular space 13 therebetween. While not shown here, inasmuch as the invention is not concerned with reactor construction or operation, per se, it will be understood that the nuclear reactor vessel and various ancillary components are located within the confines of primary shell 11.

In practice, the primary and secondary shells 11 and 12 are generally made of sheet steel, properly welded to form an air-tight housing. At the bottom, the shells 11 and 12 are imbedded in a cylindrical reinforced concrete base 14 which extends below the ground level. Advantageously, a reinforced concrete shield 15 also completely surrounds the outer shell 12, forming a biological shield against contaminated products leaking through the primary shell, thus providing added safety in the containment structure.

Advantageously, annular space 13 is filled with a porous material, preferably concrete of rough granular structure and of relatively low density, such as "popcorn" concrete, or other equivalent material. The porous filling has the advantage, aside from lending additional reinforcement and absorption qualities for radiation, that it permits the passage of gases. Thus, annulus 13 may also serve as a channel from which gases may be exhausted and pumped back into the interior of the inner shell 11 providing an additional safeguard against leakage of radioactive or toxic vapors to the surrounding atmosphere.

The pump-back arrangement includes one or more conduits 16 which lead from the annulus 13 to a compressor 17 (shown schematically by block diagram) and serves to evacuate air, gas, or vapor from this space. A second conduit 18 leads from the compressor to pump the exhausted gases back into the interior of the shell 11 through a penetration at 19. Valves 22 and 24 may also be provided, together with a vent conduit 26, to discharge exhausted and filtered gases to the atmosphere if desired. Measuring means 28, 29 may also be included in the pump-back system, as shown schematically in FIGURE 1. Finally, a filter 20 may be provided in conduit 26 so as to filter the exhausted gases prior to their discharge to the atmosphere.

While leak-tightness of the shells 11 and 12 is, of course, carefully assured in their erection and assembly, a fault may occur at a later time due to stresses of operating conditions. It is of great importance not only to detect such leakage, but foremost to locate the area where the leakage occurs in order to repair the damage as speedily as possible. It is particularly difficult to locate a leak in the outer shell of a dual containment structure since it is isolated from both the outside and inside by the reinforced concrete 14, 15 and inner shell 11, respectively.

In accordance with the invention, as here preferably embodied, a surveillance system is provided which, by simple means and procedures, signals the location of the area where the integrity, i.e., the leak-tightness of the outer isolated containment shell is lost at the same time that the existence of the leak is detected.

To this end, a plurality of channel members 30, each suitably perforated as at 31, are provided in annular space 13, suitably secured to the inner surface of the outer shell 12. Channel members 30 radiate at equidistant intervals from an annular manifold 32 in the dome portion of shell 12 to extend along the entire vertical length of the shell. Advantageously, radial channels 34, spaced apart 90°, communicate annular manifold 32 with a small circular chamber 35 at the apex of the shell 12. A suitable conduit 36 extends vertically upwardly from chamber 35 through a suitable leaktight fitting in shell 12 and terminates in a removable cap (not shown in detail) exteriorly of concrete shield 15. A source of inert gas (not shown) is suitably connected to conduit 36 to be conducted to annular space 13 and within channel members 30 through channels 32, 34 as will be more fully described hereinafter. Auxiliary conduits 37 may also be provided extending into channels 34 and similarly to conduit 36, suitably connected to a source of inert gas.

Each channel member 30 contains a plurality of leak-locating conduits, indicated generally by reference numeral 40, the several conduits of each said plurality being of varying lengths so as to terminate at predetermined intervals of distance along the entire elevational periphery of the shell 12, as is best seen in FIGURE 4. Thus, the longest conduit 40a of each group 40 terminates near the bottom of the structure, whereas the shortest conduit 40b terminates near the apex of the dome of the containment sructure.

As here preferably embodied, the conduits of each plurality of conduits 40 terminate near the apex of the containment structure in vertically upwardly extending portions 42 which pass through suitable leaktight fittings in shell 12 and whose ends are closed with removable caps (not shown in detail) exteriorly of the containment structure.

It will be seen from the foregoing that the detection and location of a leak in the outer containment shell 12 is determined as follows: Annular space 13 is first purged of air by introducing inert gas at the top of the vessel throught conduit 36 and if necessary or desired, through auxiliary conduits 37, and exhausting from the bottom by means of the pump-back compressor 17, while maintaining a negative pressure in the annular space. Advantageously, after the annulus has been purged of air, the inert gas is introduced at a rate approximately equal to the tolerable rate of leakage for the particular containment structure. In this connection, it is noted that ecceptable leakage rates are on the order of 0.1–0.2 percent of the containment volume in a 24-hour period.

Thereafter, each conduit of each plurality of conduits is uncovered and connected, seriatim, to a vacuum pump and a suitable oxygen analyzer, illustrated schematically in FIGURE 1 at 44, 45, respectively. The small vacuum maintained in the annular space causes air from the outside to be drawn into the annulus at the site of the leak, and this air, in turn, is drawn through the particular conduit whose open end terminates nearest the site of the leak. The gas exhausted from the conduits is analyzed by oxygen analyzer 45 to determine its oxygen content. Manifestly, the conduit which terminates nearest to the site of the defect in the shell will have the highest oxygen content.

It will be apparent from the foregoing that by sequentially analyzing each of the conduits in the groups 40, the site of the leak can be pinpointed within the area of the horizontal and vertical spacial distribution of termination points of the individual conduits.

It will further be understood that while limited by obvious engineering and economic practicalities, the greater the number of leak-locating conduit containing channels 30 and the greater the number of conduits 40 carried in each channel 30, the greater is the accuracy with which the location of the defect in the containment may be determined. However, location of the leak within an area of about ten feet by ten feet is satisfactory for a commercially acceptable containment vessel. Thus, in the embodiment shown for a containment shell 12 of an approximate diameter of 75 feet and height of 200 feet, this requires approximately 44 channel members 30, with each channel member containing approximately 20 leak-locating conduits.

It will also be understood that, while preferred, channel members 30 may be omitted and, alternatively, an open channel in the porous filling material may be formed by the use of channel-shaped slip forms. In the event that no fill material is placed between the containment shells, channel member 30 may be entirely omitted. In addition, while not shown in the accompanying drawings for purposes of simplicity, leaks in the outer membrane of the floor could be detected and located by means of a similar system.

Thus, the invention in its broader aspects is not limited to the specific embodiment herein shown and described but departures may be made therefrom within the scope of the accompanying claims, without departing from the principles of the invention and without sacrificing its chief advantages.

What is claimed is:

1. In a containment structure for a nuclear reactor having an outer pressure-containing reinforced concrete shell, a steel outer containment shell within and adjacent to said concrete shell and a steel inner containment shell within and inwardly spaced from said outer steel shell so as to create an annular space between said steel containment shells,
   a leak detecting locating system for monitoring the integrity of said outer steel containment shell comprising:
   conduit means in said annular space adjacent the inner wall of said outer steel containment shell,
      said conduit means having openings therein at predetermined spacial distances therebetween,
   said conduit means terminating exteriorly of said containment structure in removable end closure means;
   vacuum-producing means adapted to be connected to the terminal ends of said conduit means to exhaust gas therefrom;
   means for analyzing the oxygen content of the gas exhausted from said conduit means; and
   means for evacuating air from said annular space and maintaining a negative pressure therein.

2. A leak detecting and locating system as claimed in claim 1, wherein:
   said conduit means comprises a plurality of groups of a plurality of individual tubular conduit members;
   said groups are distributed at equidistant intervals from each other over substantially the entire circumferential periphery of said outer steel containment shell; and
   the individual conduit members of each of said groups are each of a different length so that said conduit members terminate at predetermined elevational distances along substantially the entire elevational periphery of said outer containment shell.

3. In a containment structure for a nuclear reactor having an outer pressure-containing reinforced concrete shell, a steel outer containment shell within and adjacent to said concrete shell, and a steel inner containment shell within and inwardly spaced from said outer steel shell so as to create an annular space between said steel containment shells,
   a method of detecting and locating a leak in said steel outer containment shell, comprising the steps of:
   removing residual air from said annular space;
   thereafter maintaining a slightly negative pressure in said annular space;
   sequentially exhausting gas from a plurality of points located in a predetermined pattern adjacent the inner wall of said outer steel containment shell; and
   analyzing the oxygen content of the exhausted gas, whereby the exhausted gas having the greatest oxygen content indicates the position of a leak in said shell.

4. The method as claimed in claim 3, wherein:
   said residual air in said annular space is removed by bleeding an inert gas into said space at one end thereof and exhausting from said space at the opposite end.

References Cited

UNITED STATES PATENTS

| | | | |
|---|---|---|---|
| 3,258,403 | 6/1966 | Malay | 176—37 |
| 3,288,998 | 11/1966 | Press | 176—87 |
| 3,320,969 | 5/1967 | Gordon | 176—87 |
| 3,322,141 | 5/1967 | Gans et al. | 176—38 |

BENJAMIN R. PADGETT, *Primary Examiner.*

H. E. BEHREND, *Assistant Examiner.*

U.S. Cl. X.R.

176—38, 87